(12) United States Patent
Ryu et al.

(10) Patent No.: US 9,874,153 B2
(45) Date of Patent: Jan. 23, 2018

(54) SYSTEM AND METHOD FOR CONTROLLING VALVE TIMING OF CONTINUOUS VARIABLE VALVE DURATION ENGINE

(71) Applicant: HYUNDAI MOTOR COMPANY, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/333,973

(22) Filed: Oct. 25, 2016

(65) Prior Publication Data

US 2017/0234243 A1  Aug. 17, 2017

(30) Foreign Application Priority Data

Feb. 11, 2016  (KR) .......................... 10-2016-0015738

(51) Int. Cl.
*F02D 13/02* (2006.01)
*F01L 1/40* (2006.01)
(Continued)

(52) U.S. Cl.
CPC ............ *F02D 13/0207* (2013.01); *F01L 1/40* (2013.01); *F02D 13/0234* (2013.01);
(Continued)

(58) Field of Classification Search
CPC ............ F02D 13/0215; F02D 13/0234; F02D 13/0238; F02D 13/0249; F02D 13/0261; F01L 1/40; F01L 2800/06; F01L 2800/10
(Continued)

(56) References Cited

U.S. PATENT DOCUMENTS 5,450,824 A * 9/1995 Yamane ................ F02D 13/023
123/90.15
5,626,109 A * 5/1997 Yasumura ................ F01L 1/34
123/90.15

(Continued)

FOREIGN PATENT DOCUMENTS

KR        10-0321206 B1    1/2002
KR     10-2009-0013007 A    2/2009
WO        2013-171830 A1   11/2013

*Primary Examiner* — Erick Solis

(74) *Attorney, Agent, or Firm* — Brinks Gilson & Lione

(57) ABSTRACT

The method for controlling valve timing of an engine includes: classifying control regions; applying a maximum duration to an intake valve and a long duration to an exhaust valve in a first control region; advancing Intake Valve Closing timing, applying the long duration to the exhaust valve, and maintaining a maximum valve overlap in a second control region; applying the long duration to the exhaust valve and advancing the IVC timing and Exhaust Valve Closing timing in a third control region; applying a short duration to the exhaust valve and controlling the EVC timing in a fourth control region; controlling a throttle valve, applying the short duration to the exhaust valve, and retarding Exhaust Valve Opening timing in a fifth control region; and controlling the throttle valve and the EVC timing, applying the long duration to the exhaust valve, advancing the EVO timing in a sixth control region.

12 Claims, 10 Drawing Sheets

(51) Int. Cl.
*F02D 41/00* (2006.01)
*F02D 41/02* (2006.01)
*F02D 41/14* (2006.01)
*F02D 41/26* (2006.01)

(52) U.S. Cl.
CPC ..... *F02D 13/0238* (2013.01); *F02D 13/0249* (2013.01); *F02D 13/0261* (2013.01); *F02D 41/0007* (2013.01); *F02D 41/0235* (2013.01); *F02D 41/1498* (2013.01); *F02D 41/26* (2013.01); F01L 2800/10 (2013.01); F02D 2200/101 (2013.01); F02D 2200/1002 (2013.01)

(58) Field of Classification Search
USPC .......................... 123/90.15–90.18, 345–348
See application file for complete search history.

(56) References Cited

U.S. PATENT DOCUMENTS

| | | | | |
|---|---|---|---|---|
| 6,390,040 | B1* | 5/2002 | Hammoud | F01L 9/04 123/406.29 |
| 8,561,394 | B2* | 10/2013 | Porten | F01N 3/0842 30/280 |
| 2002/0066436 | A1* | 6/2002 | Majima | F01L 1/34 123/406.47 |
| 2002/0134081 | A1* | 9/2002 | Shiraishi | F01N 3/28 60/602 |

\* cited by examiner

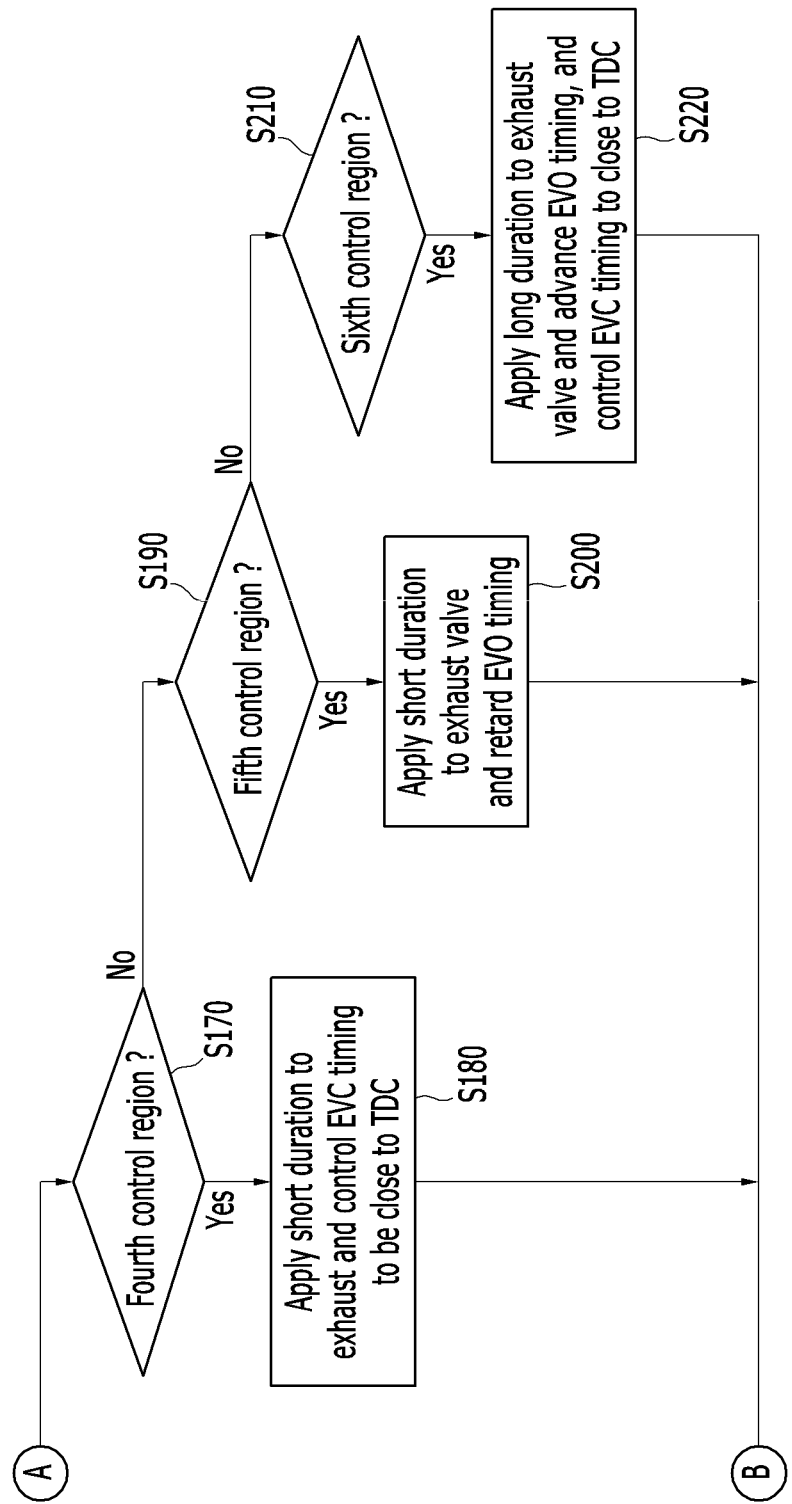

SYSTEM AND METHOD FOR CONTROLLING VALVE TIMING OF CONTINUOUS VARIABLE VALVE DURATION ENGINE

CROSS-REFERENCE TO RELATED APPLICATION

This application claims priority to and the benefit of Korean Patent Application No. 10-2016-0015738, filed on Feb. 11, 2016, the entire contents of which are incorporated herein by reference.

FIELD

The present disclosure relates to a system and a method for controlling valve timing of a continuous variable valve duration engine.

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

In this case, a camshaft is driven by a timing belt connected with a crankshaft that converts linear motion of a piston by explosion pressure into rotating motion to actuate an intake valve and an exhaust valve, and while the intake valve is opened, air is suctioned into a combustion chamber, and while an exhaust valve is opened, gas which is combusted in the combustion chamber is exhausted.

To improve the operations of the intake valve and the exhaust valve and thereby improve engine performance, a valve lift and a valve opening/closing time (timing) may be controlled according to a rotational speed or load of an engine. Therefore, a continuous variable valve duration (CVVD) device controlling opening duration of an intake valve and an exhaust valve of the engine and a continuous variable valve timing (CVVT) device controlling opening timing and closing timing of the intake valve and the exhaust valve of the engine have been developed.

The CVVD device adjusts opening duration (opening time) of the valve. In addition, the CVVT device advances or retards opening and closing timing of the valve in a state in which the duration of the valve is fixed. In other words, when the opening timing of the valve is determined, the closing timing is automatically determined according to the duration of the valve.

The above information disclosed in this Background section is only for enhancement of understanding of the background of the present disclosure and therefore it may contain information that does not form the prior art that is already known to a person of ordinary skill in the art.

SUMMARY

The present disclosure provides a system and a method for controlling valve timing of a continuous variable valve duration engine having advantages of simultaneously controlling duration and timing of a continuous variable valve by mounting a continuous variable valve timing device on an intake valve side and by mounting a two-stage variable valve duration device and a continuous variable valve timing device on an exhaust valve side in a turbo engine.

In one form of the present disclosure, a method for controlling valve timing is provided for a turbo engine which includes: a continuous variable valve timing (CVVT) device on an intake valve side, and a two-stage variable valve duration (VVD) device and a continuous variable valve timing (CVVT) device on an exhaust valve side. The method may include: classifying a plurality of control regions depending on an engine load and an engine speed; applying a maximum duration to an intake valve and a long duration to an exhaust valve in a first control region; advancing intake valve closing (IVC) timing, applying the long duration to the exhaust valve, and maintaining a maximum valve overlap in a second control region; applying the long duration to the exhaust valve and advancing the IVC timing and exhaust valve closing (EVC) timing in a third control region; applying a short duration to the exhaust valve and controlling the EVC timing to be close to a top dead center (TDC) in a fourth control region; controlling a throttle valve to be fully opened, applying the short duration to the exhaust valve, and retarding exhaust valve opening (EVO) timing in a fifth control region; and controlling the throttle valve to be fully opened, applying the long duration to the exhaust valve, advancing the EVO timing, and controls the EVC timing to be close to the TDC in a sixth control region.

The IVC timing may be fixed and the EVC timing may be set as a maximum value capable of maintaining combustion stability in the first control region.

The maximum valve overlap may be maintained by retarding the EVC timing according to an increase of the engine load in the second control region.

The IVC timing may be advanced to be close to a bottom dead center (BDC) when the engine speed is less than a predetermined speed and the IVC timing may be advanced to an angle after the BDC when the engine speed is equal to or greater than the predetermined speed in the third region.

Intake valve opening (IVO) timing may be advanced before the TDC to generate a scavenging phenomenon and the EVC timing may be controlled to an angle after the TDC to maintain catalyst temperature in the fifth control region.

The IVC timing may be controlled to an angle after the bottom dead center (BDC) to inhibit or prevent knocking in the sixth control region.

In another form according to the present disclosure, a system for controlling valve timing of a continuous variable valve duration engine including a turbocharger is provided. The system may include: a data detector detecting data related to a running state of a vehicle; a camshaft position sensor detecting a position of a camshaft; an intake continuous variable valve timing (CVVT) configured to control opening timing and closing timing of an intake valve of the engine; an exhaust two-stage variable valve duration (VVD) device configured to control opening duration of an exhaust valve of the engine in two stages; an exhaust continuous variable valve timing (CVVT) device configured to control opening timing and closing timing of the exhaust valve; and a controller classifying a plurality of control regions depending on an engine speed and an engine load based on signals from the data detector and the camshaft position sensor, and controlling operations of the intake CVVT device, the exhaust two-stage VVD device, and the exhaust CVVT device according to the control regions, wherein the controller applies a maximum duration to the intake valve and a long duration to the exhaust valve in a first control region, advances intake valve closing (IVC) timing, applies the long duration to the exhaust valve, and maintains a maximum valve overlap in a second control region, applies the long duration to the exhaust valve and advances the IVC timing and exhaust valve closing (EVC) timing in a third control region, applies a short duration to the exhaust valve and controls the EVC timing to be close to a top dead center (TDC) in a fourth control region, controls a throttle valve to be fully opened, applies the short duration to the exhaust valve, and retards exhaust valve opening (EVO) timing in a fifth control region, and controls the throttle valve to be fully opened, applies the long duration to the exhaust valve, advances the EVO timing, and controls the EVC timing to be close to the TDC in a sixth control region.

The controller may fix the IVC timing and may set the EVC timing as a maximum value capable of maintaining combustion stability in the first control region.

The controller may maintain the maximum valve overlap by retarding the EVC timing according to an increase of the engine load in the second control region.

The controller may advance the IVC timing to be close to a bottom dead center (BDC) when the engine speed is less than a predetermined speed and may advance the IVC timing to an angle after the BDC when the engine speed is equal to or greater than the predetermined speed in the third region.

The controller may advance intake valve opening (IVO) timing before the TDC to generate a scavenging phenomenon and may control the EVC timing to an angle after the TDC to maintain catalyst temperature in the fifth control region.

The controller may control the IVC timing to an angle after the bottom dead center (BDC) to inhibit or prevent knocking in the sixth control region.

According to one form of the present disclosure, duration and timing of the continuous variable valve are simultaneously controlled, so the engine may be controlled under desirable conditions.

According to the present disclosure, opening timing and closing timing of the intake valve and the exhaust valve are appropriately controlled, thereby improving fuel efficiency under a partial load condition and power performance under a high load condition. In addition, a fuel amount for start may be reduced by increasing an effective compression ratio, and exhaust gas may be reduced by shortening time for heating a catalyst.

Since the two-stage variable valve duration device is used instead of a continuous variable valve duration device on the exhaust valve side, production cost may be reduced with maintaining power performance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 3A-3B are flowcharts showing a method for controlling valve timing of a continuous variable valve duration engine;

Figure 1:
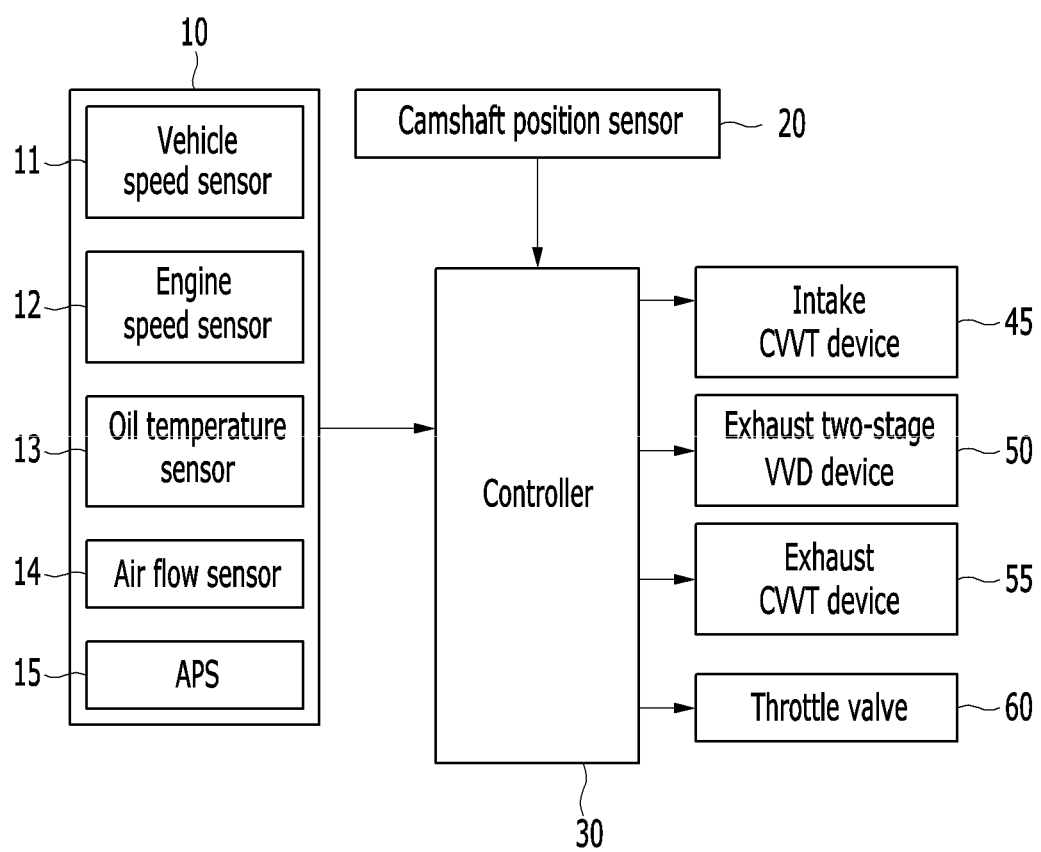
FIG. 1 is a schematic block diagram showing a system for controlling valve timing of a continuous variable valve duration engine.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar terms as used herein is inclusive of motor vehicles in general including hybrid vehicles, plug-in electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller. The term controller referred to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics or a controller area network (CAN).

FIG. 1 is a schematic block diagram showing a system for controlling valve timing of a continuous variable valve duration engine according to one form of the present disclosure.

In the exemplary form, the engine as a power source of a vehicle is a turbo engine that includes a turbocharger.

As shown in FIG. 1, a system for controlling valve timing of a continuous variable valve duration engine includes: a data detector 10, a camshaft position sensor 20, a controller 30, an intake continuous variable valve timing (CVVT) apparatus 45, an exhaust two-stage variable valve duration (VVD) device 50, an exhaust continuous variable valve timing (CVVT) apparatus 55, and a throttle valve 60.

The data detector 10 detects data related to a running state of the vehicle for controlling the CVVT devices and the VVD device, and includes: a vehicle speed sensor 11, an engine speed sensor 12, an oil temperature sensor 13, an air flow sensor 14, and an accelerator pedal position sensor 15, although other sensors may be employed as desired.

The vehicle speed sensor 11 detects a vehicle speed, and transmits a signal corresponding thereto to the controller 30. The vehicle speed sensor 11 may be mounted at a wheel of the vehicle.

The engine speed sensor 12 detects an engine speed from a change in phase of a crankshaft or camshaft, and transmits a signal corresponding thereto to the controller 30.

The oil temperature sensor (OTS) 13 detects temperature of oil flowing through an oil control valve (OCV), and transmits a signal corresponding thereto to the controller 30.

The oil temperature detected by the oil temperature sensor 13 may be determined by determining a coolant temperature using a coolant temperature sensor mounted at a coolant passage of an intake manifold. Therefore, in one form, the oil temperature sensor 13 may include the coolant temperature sensor, and the oil temperature should be understood to be the coolant temperature.

The air flow sensor 14 detects an air amount flowing into the intake manifold, and transmits a signal corresponding thereto to the controller 30.

The accelerator pedal position sensor 15 detects a degree at which a driver pushes an accelerator pedal, and transmits a signal corresponding thereto to the controller 30. A position value of the accelerator pedal is 100% when the accelerator pedal is pressed fully, and the position value of the accelerator pedal is 0% when the accelerator pedal is not pressed at all.

A throttle valve position sensor that is mounted on an intake passage may be used instead of the accelerator pedal position sensor 15. Therefore, in one form of the present disclosure, the accelerator pedal position sensor 15 may include the throttle valve position sensor, and the position value of the accelerator pedal should be understood to be an opening value of the throttle value.

The camshaft position sensor 20 detects a position of a camshaft angle, and transmits a signal corresponding thereto to the controller 30.

Figure 2:
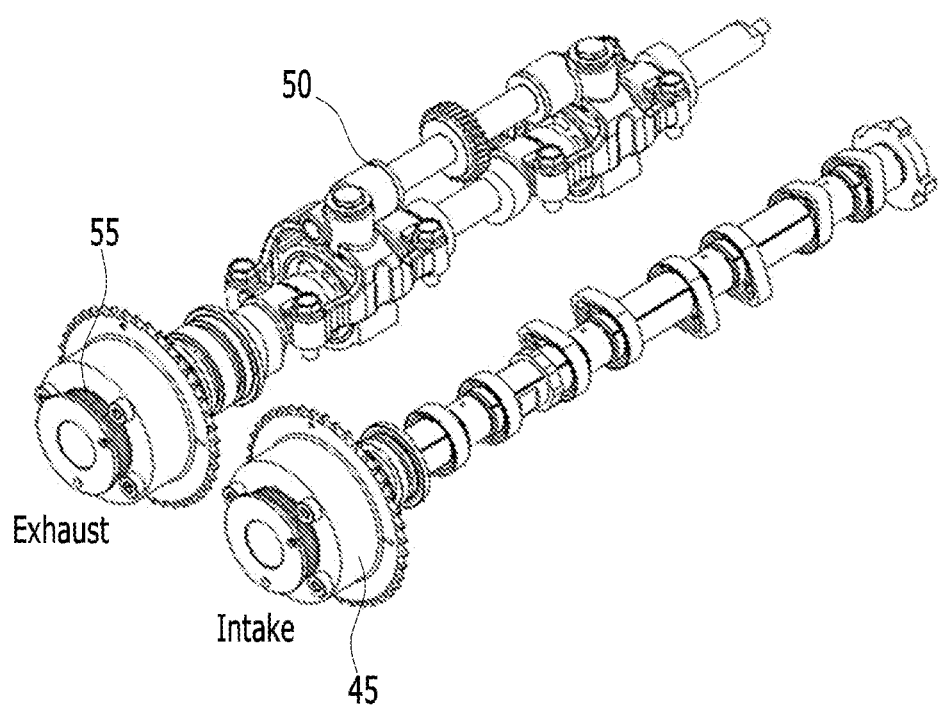
FIG. 2 is a perspective view showing an intake provided with a continuous variable valve timing device and an exhaust provided with a two-stage variable valve duration device and a continuous variable valve timing device.

FIG. 2 is a perspective view showing an intake provided with a continuous variable valve timing device and an exhaust provided with a two-stage variable valve duration device and a continuous variable valve timing device according to an exemplary form of the present disclosure.

As shown in FIG. 2, the continuous variable valve timing device is mounted on the intake, and the two-stage variable valve duration device and the continuous variable valve timing device are mounted on the exhaust. Therefore, an intake valve duration (IVD) is fixed in one form of the present disclosure. If the IVD becomes long, fuel efficiency and high speed performance of the vehicle may be improved, but low speed performance may be deteriorated. Thus, the IVD may be fixed at a predetermined angle of approximately 250 to 260 degrees.

The intake continuous variable valve timing (CVVT) device 45 controls opening timing and closing timing of the intake valve of the engine according to a signal from the controller 30, and the exhaust continuous variable valve timing (CVVT) device 55 controls opening timing and closing timing of the exhaust valve of the engine according to a signal from the controller 30.

The exhaust two-stage variable valve duration (VVD) device 50 controls opening duration of the exhaust valve of the engine in two stages according to a signal from the controller 30. Since the two-stage VVD device 50 operated by a solenoid valve is used instead of a CVVD device, a motor and a sensor for operating the CVVD device can be omitted, thereby reducing production cost.

If exhaust valve duration (EVD) becomes long, fuel efficiency and high speed performance of the vehicle may be improved, but low speed performance may be deteriorated. Thus, a short duration for low speed performance and a long duration for high speed performance may be set by experiments. For example, the short duration may be set at an angle of approximately 180 to 210 degrees, and the long duration may be set at an angle of approximately 240 to 250 degrees.

The exhaust two-stage VVD device 50 may apply the short duration and the long duration to the exhaust valve by switching.

The throttle valve 60 adjusts the air amount flowing into the intake manifold.

The controller 30 classifies a plurality of control regions depending on an engine speed and an engine load based on signals of the data detector 10 and the camshaft position sensor 20, and controls operations of the intake CVVT device 45, the exhaust two-stage VVD device 50, the exhaust CVVT device 55, and the throttle valve 60. Herein, the plurality of control regions may be classified into six regions.

The controller 30 applies a maximum duration to the intake valve and applies the long duration to the exhaust valve in a first control region, advances intake valve closing (IVC) timing and applies the long duration to the exhaust valve to maintain a maximum valve overlap in a second control region, applies the long duration to the exhaust valve and advances the IVC timing and exhaust valve closing (EVC) timing in a third control region, applies the short duration to the exhaust valve and controls the EVC timing to be close to a top dead center (TDC) in a fourth control region, controls the throttle valve to be fully opened and applies the short duration to the exhaust valve and retards exhaust valve opening (EVO) timing in a fifth control region, and controls the throttle valve to be fully opened, applies to the long duration to the exhaust valve, advances the EVO timing and controls the EVC timing to be close to TDC in a sixth control region.

For these purposes, the controller 30 may be implemented with at least one processor executed by a predetermined program, and the predetermined program may programmed in order to perform each step of a method for controlling valve timing of a continuous variable valve duration engine.

Various forms described herein may be implemented within a recording medium that may be read by a computer or a similar device by using software, hardware, or a combination thereof, for example.

According to hardware implementation, the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units designed to perform any other functions.

According to software implementation, forms such as procedures and functions described in the present forms may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to one form of the present disclosure will be described in detail with reference to FIG. 3A to FIG. 5C.

Figure 3A:
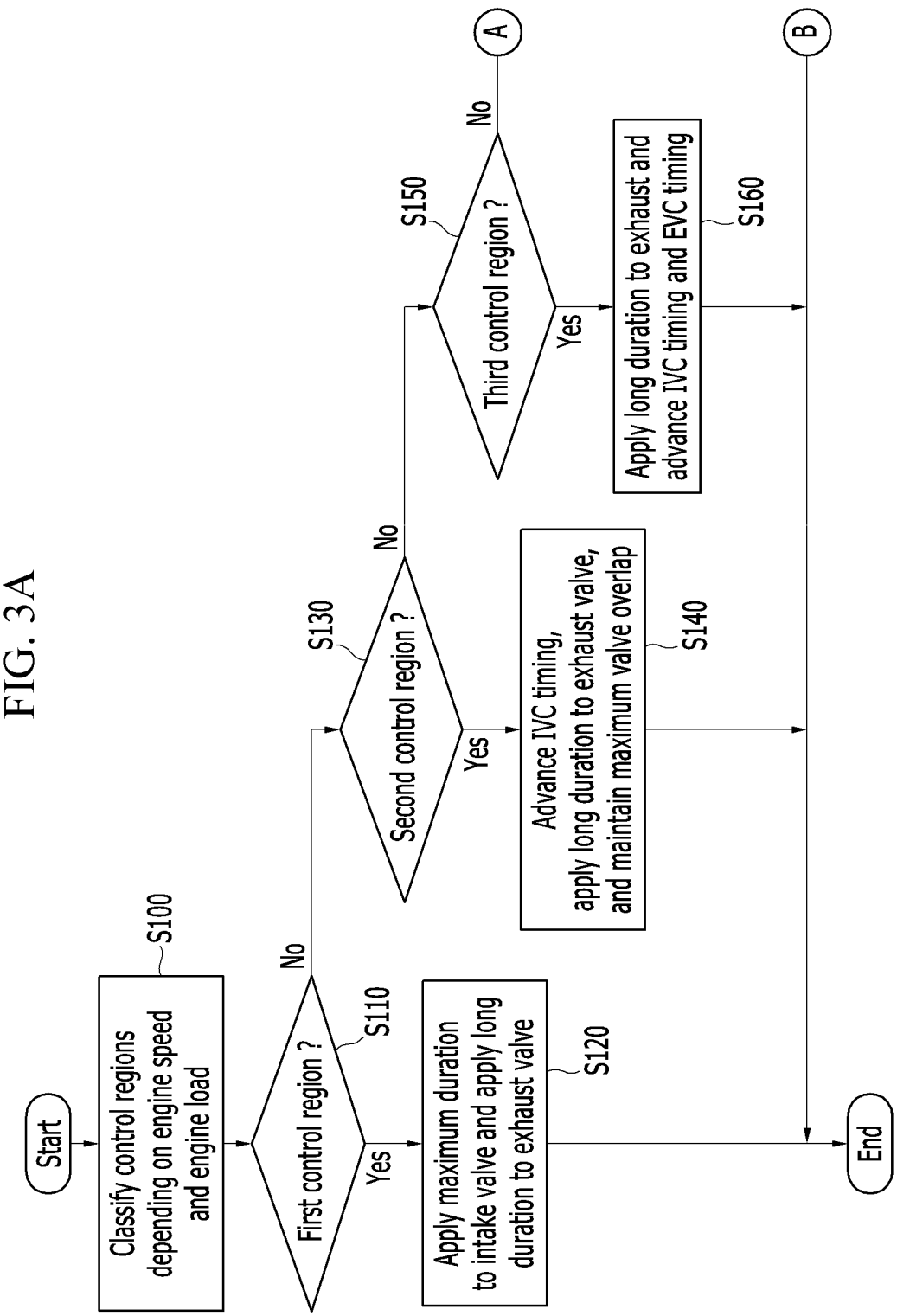
Figure 4A:
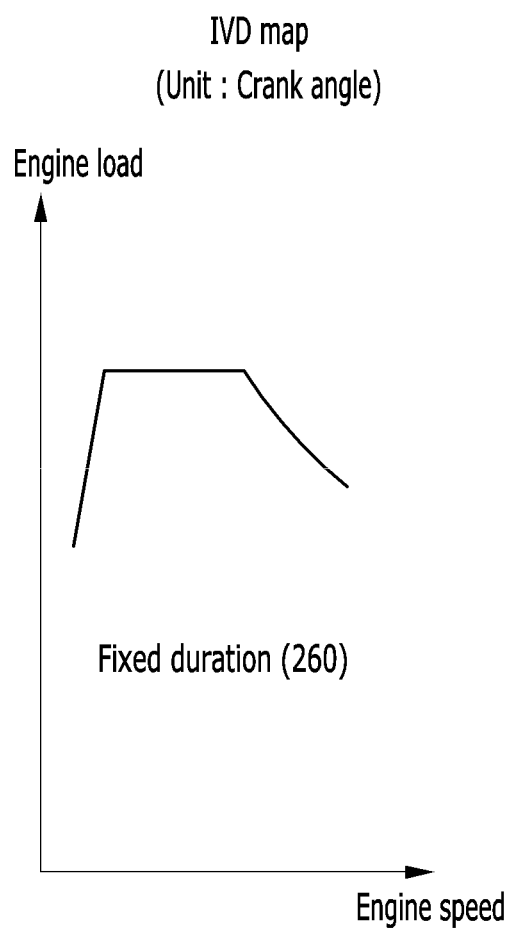
FIGS. 4A-4C are graphs showing duration, opening timing, and closing timing of an intake valve depending on an engine load and an engine speed.
Figure 4B:
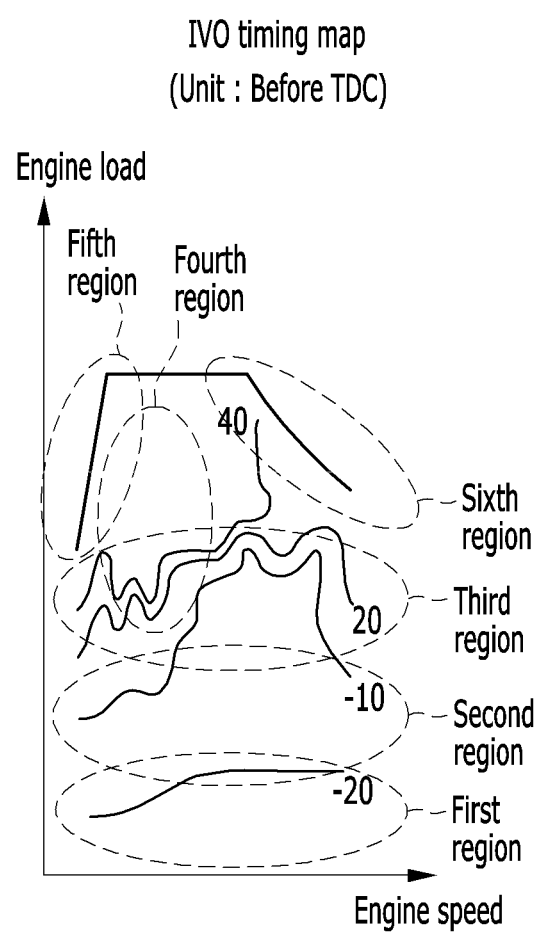
Figure 4C:
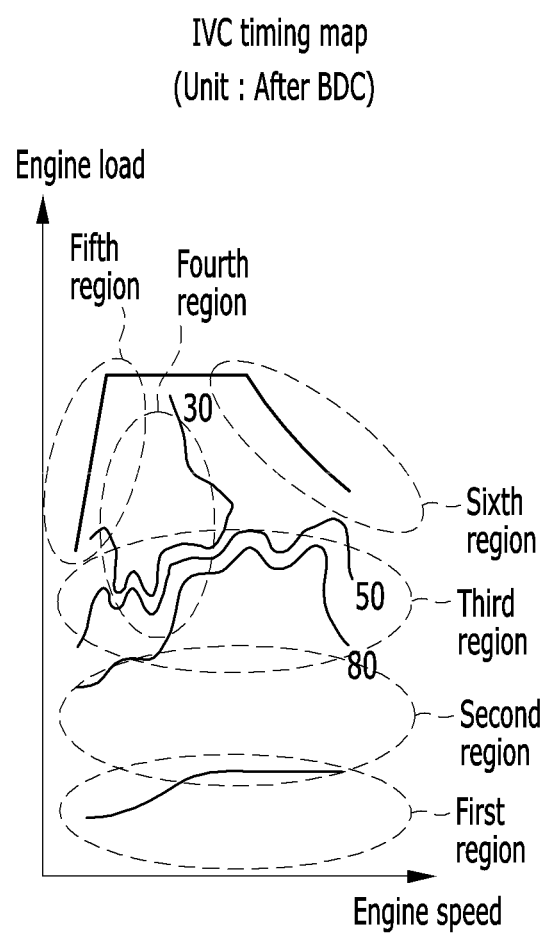
Figure 5A:
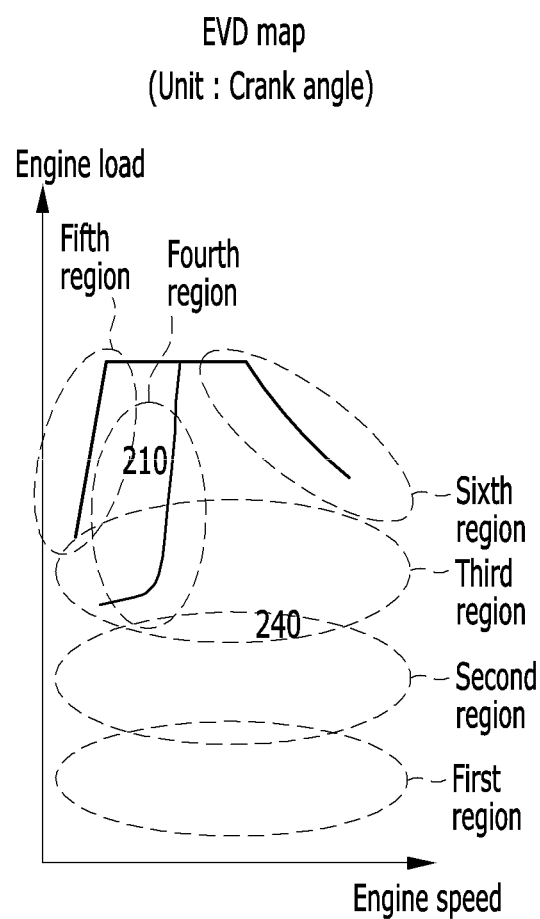
FIGS. 5A-5C are graphs showing duration, opening timing, and closing timing of an exhaust valve depending on an engine load and an engine speed.
Figure 5B:
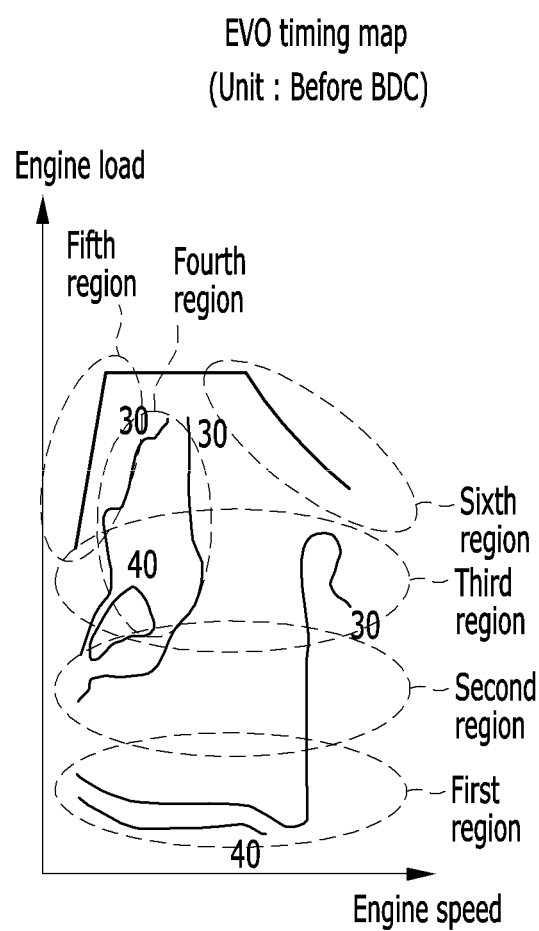
Figure 5C:
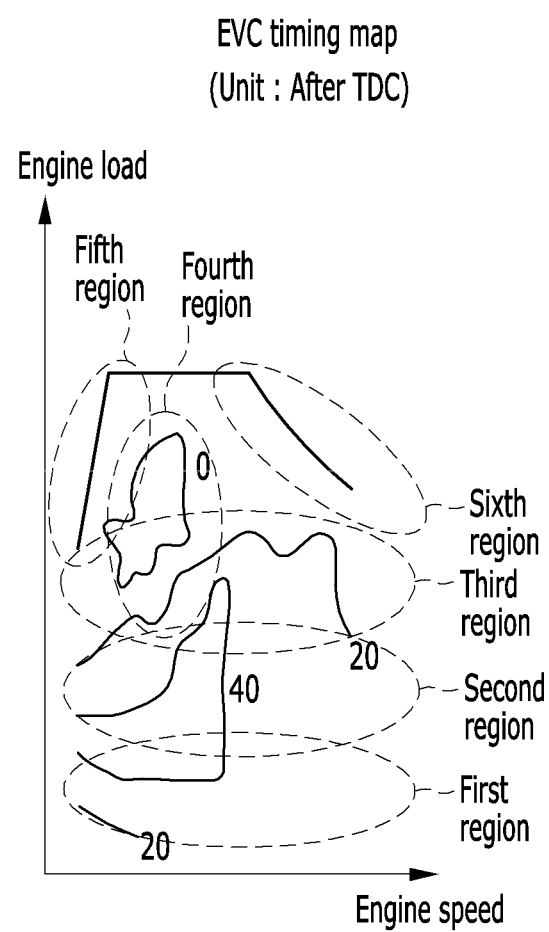

FIGS. 3A-3B are a flowchart showing a method for controlling valve timing of a continuous variable valve duration engine. In addition, FIGS. 4A-4C are graphs respectively showing duration, opening timing, and closing timing of an intake valve depending on an engine load and an engine speed, and FIGS. 5A-5C are graphs respectively showing duration, opening timing, and closing timing of an exhaust valve depending on an engine load and an engine speed.

As shown in FIGS. 3A-3B, a method for controlling valve timing of a continuous variable valve duration engine begins with classifying a plurality of control regions depending on an engine load and an engine speed at step S100. The first to sixth control regions are indicated in FIG. 4A to FIG. 5C.

The controller 30 may classify control regions as the first control region when the engine load is less than a first predetermined load, the second control region when the engine load is equal to or greater than the first predetermined load and less than a second predetermined load, and the third control region when the engine load is equal to or greater than the second predetermined load and less than a third predetermined load. In addition, the controller 30 may classify control regions as the fourth control region when the engine load is equal to or greater than the second predetermined load and the engine speed is equal to or greater than a first predetermined speed and less than a second predetermined speed, the fifth control region when the engine load is equal to or greater than the third predetermined load and the engine speed is less than the first predetermined speed, and the sixth control region when the engine load is equal to or greater than the third predetermined load and the engine speed is equal to or greater than the second predetermined speed.

Meanwhile, as shown in FIG. 4A to FIG. 5C, a crank angle is indicated in an intake valve duration (IVD) map and an exhaust valve duration (EVD) map. In addition, a number designated in an intake valve opening (IVO) timing map represents before top dead center (TDC), a number designated in an intake valve closing (IVC) timing map represents after bottom dead center (BDC), a number designated in an exhaust valve opening (EVO) timing map represents before BDC, and a number designated in an exhaust valve closing (EVC) timing map represents after TDC. Regions and curved lines shown in FIG. 4A to FIG. 5C are just examples for describing the exemplary form of the present disclosure, and the present disclosure is not limited thereto.

When the control regions are classified depending on the engine load and the engine speed at step S100, the controller 30 determines whether a current engine state belongs to the first control region at step S110.

When the engine load is less than the first predetermined load at step S110, the controller 30 determines that the current engine state belongs to the first control region. In this case, the controller 30 applies the maximum duration to the intake valve, applies the long duration to the exhaust valve, and controls a valve overlap between the exhaust valve and the intake valve at step S120. The valve overlap represents a state in which the intake valve is opened and the exhaust valve is not yet closed.

In other words, when the engine is operated at a low load condition, the controller 30 may fix the IVC timing to apply the maximum duration to the intake valve. As shown in FIGS. 4A-4C, the IVC timing may be fixed at an angle of approximately 100 to 110 degrees after bottom dead center (BDC), and the IVO timing may be controlled to an angle of approximately 20 to 30 degrees before top dead center (TDC) according to the fixed IVD.

In addition, the controller 30 may set the EVC timing as a maximum value capable of maintaining combustion stability by moving the EVC timing in an after TDC direction. In this case, since the long duration is applied to the exhaust valve, the controller 30 controls the EVO timing to an angle of approximately 40 to 50 degrees before BDC When the current engine state does not belong to the first control region at step S110, the controller 30 determines whether the current engine state belongs to the second control region at step S130.

When the engine load is equal to or greater than the first predetermined load and is less than the second predetermined load at step S130, the controller 30 determines that the current engine state belongs to the second control region. In this case, the controller 30 advances the IVC timing, applies the long duration to the exhaust valve, and maintains a maximum valve overlap at step S140.

As described above, when the IVC timing is controlled to a late intake valve close (LIVC) position (at the angle of approximately 100-110 degrees after BDC) in the first control region, the valve overlap is limited. Accordingly, the controller 30 advances the IVC timing to generate the valve overlap in the second control region.

In addition, the controller 30 may maintain the maximum valve overlap by retarding the EVC timing in the after TDC direction according to an increase of the engine load.

When the EVC timing is retarded in the after TDC direction, as the valve overlap is increased, intake pumping may be decreased, however, since the EVO timing is close to BDC, exhaust pumping may be increased. Since the long duration of the exhaust valve is used in the second control region, the exhaust pumping is not deteriorated and the maximum valve overlap can be used.

When current engine state does not belong to the second control region at step S130, the controller 30 determines whether the current engine state belongs to the third control region at step S150.

When the engine load is equal to or greater than the second predetermined load and is less than the third predetermined load, the controller 30 determines that the current engine state belongs to the third control region. In this case, the controller 30 applies the long duration to the exhaust valve and advances the IVC timing and the EVC timing at step S160.

When the IVC timing is positioned at the LIVC position, as the engine load is increased, boost pressure may be increased, knocking may occur, and fuel efficiency may be deteriorated. In order to inhibit or prevent the aforementioned phenomenon, the controller 30 advances the IVC timing in the third control region where the engine load is relatively large.

In this case, the controller 30 may rapidly advance the IVC timing to be close to BDC when the engine speed is less than a predetermined speed, and may slowly advance the IVC timing to an angle of approximately 30 to 50 degrees after BDC when the engine speed is equal to or greater than the predetermined speed. The predetermined speed may be around 1500 rpm.

In addition, since the maximum valve overlap is used in the first control region and the second control region, the controller 30 advances the EVC timing.

When the current engine state does not belong to the third control region at step S150, the controller 30 determines whether the current engine state belongs to the fourth control region at step S170.

When the controller 30 determines that the current engine state belongs to the fourth control region at step S170, the controller 30 applies the short duration to the exhaust valve and controls the EVC timing to be close to TDC at step S180.

The fourth control region may be a low boost region at which the engine load is equal to or greater than the second predetermined load and the engine speed is equal to or greater than the first predetermined speed and less than the second predetermined speed. For example, the first predetermined speed may be around 1500 rpm, and the second predetermined speed may be around 2500 rpm.

When the IVC timing is close to BDC and short duration of intake valve in the fourth control region, fuel efficiency may be improved. Since the IVD is fixed, when the IVC timing is controlled to be close to BDC, the IVO timing is advanced in the TDC direction and the valve overlap is increased.

Accordingly, the controller 30 controls the EVC timing to be close to TDC so as to reduce the valve overlap. For this purpose, the controller 30 may apply the short duration to the exhaust valve instead of the long duration. With reference to a switching line shown in FIGS. 5A-5C, a left side of the switching line is a region to which the short duration is applied, and a right side of the switching line is a region to which the long duration is applied.

When the current engine state does not belong to the fourth control region at step S170, the controller 30 determines whether the current engine state belongs to the fifth control region at step S190.

When the engine load is equal to or greater than the third predetermined load and the engine speed is less than the first predetermined speed at step S190, the controller 30 determines that the current engine state belongs to the fifth control region. In this case, the controller 30 controls the throttle valve 60 to be fully opened, applies the short duration to the exhaust valve, and retards the EVO timing at step S200.

In the turbo engine, when the throttle valve is fully opened (i.e., WOT; Wide Open Throttle) in the fifth control region at which the engine speed is less than the first predetermined speed (e.g., 1500 rpm), intake port pressure become higher than exhaust port pressure. Therefore, the scavenging phenomenon occurs easily compared to a naturally aspirated engine. In order to generate a scavenging phenomenon in which combustion gas is emitted due to reduction of exhaust port pressure, in one form, the IVO timing is controlled to an angle of approximately 20 to 40 degrees before TDC and the IVC timing is controlled to an angle of about 0 to 20 degrees after BDC. However, the IVD may be fixed in one form of the present disclosure, when the IVO timing is advanced before TDC, the IVC timing may be greater than approximately 20 degrees after BDC. Accordingly, the EVO timing and the EVC timing may be used to complement the scavenging phenomenon through exhaust interference reduction. In other words, the controller 30 retards the EVO timing before BDC to reduce the exhaust interference and controls the EVC timing within an angle of approximately 30 degrees after TDC to maintain catalyst temperature within a predetermined range. In this case, the controller 30 applies the short duration to the exhaust valve.

When the current engine state does not belong to the fifth control region at step S190, the controller 30 determines whether the current engine state belongs to the sixth control region at step S210.

When the engine load is equal to or greater than the third predetermined load and the engine speed is equal to or greater than the second predetermined speed, the controller 30 determines that the current engine state belongs to the sixth control region. In this case, the controller 30 controls the throttle valve 60 to be fully opened, applies the long duration to the exhaust valve, advances the EVO timing and controls the EVC timing to be close to TDC at step S220.

When the engine speed is equal to or greater than the second predetermined speed (e.g., 2500 rpm), since the exhaust port pressure is significantly greater than the intake port pressure, the scavenging phenomenon disappears. Accordingly, the controller 30 advances the EVO timing to an angle of approximately 30 degrees after BDC and controls the EVC timing to be close to TDC to inhibit or prevent exhaust pumping. In this case, the controller 30 may applies the long duration to the exhaust valve by switching the short duration applied in the fifth control region.

Meanwhile, when WOT control is performed at a high speed condition, the knocking hardly occurs in the natural aspirated engine, but on the contrary, the knocking easily occurs in the turbo engine. Accordingly, the controller 30 advances the IVC timing within an angle of approximately 50 degrees after BDC to reduce boost pressure such that the knocking is inhibited or prevented.

As described above, duration and timing of the continuous variable valve are simultaneously controlled, so the engine may be controlled under desirable conditions.

According to the present disclosure, opening timing and closing timing of the intake valve and the exhaust valve are appropriately controlled, thereby improving fuel efficiency under a partial load condition and power performance under a high load condition. In addition, a fuel amount for start may be reduced by increasing a valid compression ratio, and exhaust gas may be reduced by shortening time for heating a catalyst.

Further, since the two-stage variable valve duration device is used instead of a continuous variable valve duration device at the exhaust, production cost may be reduced with maintaining power performance.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A method for controlling valve timing of a turbo engine provided with a continuous variable valve timing (CVVT) device on an intake side and a two-stage variable valve duration (VVD) device and a continuous variable valve timing (CVVT) device on an exhaust side, the method comprising:
classifying, by a controller, a plurality of control regions depending on an engine load and an engine speed;
applying, by the controller, a maximum duration to an intake valve and a long duration to an exhaust valve in a first control region;

advancing, by the controller, an intake valve closing (IVC) timing, applying the long duration to the exhaust valve, and maintaining a maximum valve overlap in a second control region;

applying, by the controller, the long duration to the exhaust valve and advancing the IVC timing and an exhaust valve closing (EVC) timing in a third control region;

applying, by the controller, a short duration to the exhaust valve and controlling the EVC timing to be close to a top dead center (TDC) in a fourth control region;

controlling, by the controller, a throttle valve to be fully opened, applying the short duration to the exhaust valve, and retarding an exhaust valve opening (EVO) timing in a fifth control region; and controlling, by the controller, the throttle valve to be fully opened, applying the long duration to the exhaust valve, advancing the EVO timing, and controls the EVC timing to be close to the TDC in a sixth control region.

2. The method of claim 1, wherein the IVC timing is fixed and the EVC timing is set as a maximum value configured to maintain combustion stability in the first control region.

3. The method of claim 1, wherein the maximum valve overlap is maintained by retarding the EVC timing according to an increase of the engine load in the second control region.

4. The method of claim 1, wherein the IVC timing is advanced to be close to a bottom dead center (BDC) when the engine speed is less than a predetermined speed and the IVC timing is advanced to an angle after the BDC when the engine speed is equal to or greater than the predetermined speed in the third region.

5. The method of claim 1, wherein an intake valve opening (IVO) timing is advanced before the TDC to generate a scavenging phenomenon, and the EVC timing is controlled to an angle after the TDC to maintain a catalyst temperature in the fifth control region.

6. The method of claim 1, wherein the IVC timing is controlled to an angle after a bottom dead center (BDC) to inhibit knocking in the sixth control region.

7. A system for controlling valve timing of a continuous variable valve duration engine including a turbocharger, the system comprising:

a data detector configured to detect data related to a running state of a vehicle;

a camshaft position sensor configured to detect a position of a camshaft;

an intake continuous variable valve timing (CVVT) device configured to control opening timing and closing timing of an intake valve of the engine;

an exhaust two-stage variable valve duration (VVD) device configured to control opening duration of an exhaust valve of the engine in two stages;

an exhaust continuous variable valve timing (CVVT) device configured to control opening timing and closing timing of the exhaust valve; and a controller configured to classify a plurality of control regions depending on an engine speed and an engine load based on signals from the data detector and the camshaft position sensor, and configured to control operations of the intake CVVT device, the exhaust two-stage VVD device, and the exhaust CVVT device according to the control regions, wherein the controller applies a maximum duration to the intake valve and a long duration to the exhaust valve in a first control region, advances an intake valve closing (IVC) timing, applies the long duration to the exhaust valve, and maintains a maximum valve overlap in a second control region, applies the long duration to the exhaust valve and advances the IVC timing and an exhaust valve closing (EVC) timing in a third control region, applies a short duration to the exhaust valve and controls the EVC timing to be close to a top dead center (TDC) in a fourth control region, controls a throttle valve to be fully opened, applies the short duration to the exhaust valve, and retards an exhaust valve opening (EVO) timing in a fifth control region, and controls the throttle valve to be fully opened, applies the long duration to the exhaust valve, advances the EVO timing, and controls the EVC timing to be close to the TDC in sixth control region.

8. The system of claim 7, wherein the controller fixes the IVC timing and set the EVC timing as a maximum value configured to maintain combustion stability in the first control region.

9. The system of claim 7, wherein the controller maintains the maximum valve overlap by retarding the EVC timing according to an increase of the engine load in the second control region.

10. The system of claim 7, wherein the controller advances the IVC timing to be close to a bottom dead center (BDC) when the engine speed is less than a predetermined speed and advances the IVC timing to an angle after the BDC when the engine speed is equal to or greater than the predetermined speed in the third region.

11. The system of claim 7, wherein the controller advances an intake valve opening (IVO) timing before the TDC to generate a scavenging phenomenon and controls the EVC timing to an angle after the TDC to maintain a catalyst temperature in the fifth control region.

12. The system of claim 7, wherein the controller controls the IVC timing to an angle after a bottom dead center (BDC) to inhibit knocking in the sixth control region.

* * * * *